US010111264B2

(12) United States Patent
Oshida

(10) Patent No.: US 10,111,264 B2
(45) Date of Patent: Oct. 23, 2018

(54) COMMUNICATION TERMINAL AND PROGRAM

(71) Applicant: Renesas Electronics Corporation, Koutou-ku, Tokyo (JP)

(72) Inventor: Daisuke Oshida, Tokyo (JP)

(73) Assignee: Renesas Electronics Corporation, Tokyo ( * ) Notice: Subject to any disclaimer, the term of this patent is extended or adjusted under 35 U.S.C. 154(b) by 160 days.

(21) Appl. No.: 15/159,231

(22) Filed: May 19, 2016

(65) Prior Publication Data

US 2017/0034867 A1 Feb. 2, 2017

(30) Foreign Application Priority Data

Jul. 28, 2015 (JP) .................................. 2015-148543

(51) Int. Cl.
H04W 76/02 (2009.01)
H04L 29/06 (2006.01)
(Continued)

(52) U.S. Cl.
CPC ......... *H04W 76/026* (2013.01); *H04L 9/3268* (2013.01); *H04L 9/3297* (2013.01); *H04L 63/0428* (2013.01); *H04L 63/068* (2013.01); *H04L 63/123* (2013.01); *H04W 4/70* (2018.02); *H04W 12/04* (2013.01); *H04W 12/10* (2013.01);
(Continued)

(58) Field of Classification Search
CPC ............ H04W 76/026; H04W 72/0446; H04L 9/3247
See application file for complete search history.

(56) References Cited

U.S. PATENT DOCUMENTS 7,236,455 B1 * 6/2007 Proudler ................. G06F 21/34
370/230
2002/0103898 A1 * 8/2002 Moyer ................ H04L 12/2803
709/224
(Continued)

FOREIGN PATENT DOCUMENTS

JP 2008-228051 A 9/2008
JP 2013-258491 A 12/2013

OTHER PUBLICATIONS

Extended European Search Report dated Oct. 10, 2016, in European Patent Application No. EP16170319.4.

*Primary Examiner* — Jamal Javaid
(74) *Attorney, Agent, or Firm* — Shapiro, Gabor and Rosenberger, PLLC

(57) ABSTRACT

The communication terminal includes a communication interface for acquiring external time information from outside and a non-volatile memory and operates as described below. The communication terminal periodically acquires external time information, encrypts the internal time information calibrated based on the acquired external time information, and thereafter writes the encrypted internal time information into the non-volatile memory. In an initialization sequence after power-on of the communication terminal, the communication terminal reads and decrypts internal time information that is lastly written to the non-volatile memory before the power-on, newly acquires external time information, and verifies validity of the acquired external time information by comparing the acquired external time information with the read internal time information.

20 Claims, 6 Drawing Sheets

(51) Int. Cl.
    *H04W 12/04*    (2009.01)
    *H04W 12/10*    (2009.01)
    *H04W 72/04*    (2009.01)
    *H04L 9/32*    (2006.01)
    *H04W 76/16*    (2018.01)
    *H04W 4/70*    (2018.01)
    *H04W 12/12*    (2009.01)
    *H04L 29/08*    (2006.01)
    *H04W 4/04*    (2009.01)
    *H04W 4/02*    (2018.01)

(52) U.S. Cl.
    CPC ....... *H04W 72/0446* (2013.01); *H04W 76/16* (2018.02); *H04L 63/0823* (2013.01); *H04L 67/12* (2013.01); *H04L 2209/84* (2013.01); *H04L 2463/121* (2013.01); *H04W 4/02* (2013.01); *H04W 4/046* (2013.01); *H04W 12/12* (2013.01)

(56) References Cited

U.S. PATENT DOCUMENTS

| | | | |
|---|---|---|---|
| 2006/0198515 A1* | 9/2006 | Forehand | G06F 21/80 380/28 |
| 2007/0130469 A1* | 6/2007 | Alrabady | H04L 9/12 713/178 |
| 2012/0185680 A1 | 7/2012 | Buer | |

\* cited by examiner

COMMUNICATION TERMINAL AND PROGRAM

CROSS-REFERENCE TO RELATED APPLICATIONS

The disclosure of Japanese Patent Application No. 2015-148543 filed on Jul. 28, 2015 including the specification, drawings and abstract is incorporated herein by reference in its entirety.

BACKGROUND

The present invention relates to a communication terminal and a program executed in the communication terminal, in particular, the present invention can be preferably used for a communication terminal that acquires time information for verifying validity of a certificate in cryptographic communication from outside and holds the time information inside the communication terminal and a security program for detecting an attack to the time information.

In a V2X (Vehicle to X) communication (communication between vehicles, between road and vehicle, and the like) system, the reliability of time information is important to confirm an effective period of a certificate. This is to prevent a so-called replay attack in which an attacker receives a message that is normally transferred in the V2X system and transmits the message without change. Therefore, reliability is required for time information itself held by an on-vehicle terminal itself of a vehicle participating in the V2X communication.

Japanese Unexamined Patent Application Publication No. 2008-228051 discloses a cryptographic communication system in a road-vehicle communication system using a common key cryptography method. Every time an on-vehicle terminal enters an area where communication with a roadside machine is possible, the on-vehicle terminal acquires and stores GPS (Global Positioning System) information and transmits the acquired GPS information to a server, so that the on-vehicle terminal shares the same data with the server.

SUMMARY

The inventors have studied Japanese Unexamined Patent Application Publication No. 2008-228051. As a result, it is found that there is a new problem as described below.

The V2X communication supports one-to-many broadcast communication. Therefore, there is a risk that a broadcast message is used by a replay attack. To prevent the above risk, a countermeasure is taken where an expiration date is set to a certificate and the certificate is invalidated after a certain period of time elapses. At this time, time information is important. The cryptographic communication system described in Japanese Unexamined Patent Application Publication No. 2008-228051 secures reliability by acquiring time information from GPS and shares the time information with a server.

At this time, it is known that the cryptographic communication system is still vulnerable to a replay attack where the time information itself acquired from the GPS is tampered. The risk that the time information acquired from the GPS is tampered is small during normal driving or the like. However, it is known that there is a threat that a GPS module is illegally altered during parking or the like and thereby the time information is tampered.

While the means for solving the problem described above will be described below, other problems and novel features will become apparent from the description of the present specification and the accompanying drawings.

An embodiment is as described below.

A communication terminal, which holds internal time information for verifying validity of a certificate in cryptographic communication, includes a communication interface for acquiring external time information from outside, a non-volatile memory, and a processor and operates as described below.

The processor periodically acquires external time information, encrypts the internal time information calibrated based on the acquired external time information, and thereafter writes the encrypted internal time information into the non-volatile memory.

In an initialization sequence after power-on of the communication terminal, the processor reads and decrypts internal time information that is lastly written to the non-volatile memory before the power-on, newly acquires external time information, and verifies validity of the acquired external time information by comparing the acquired external time information with the read internal time information.

An effect obtained by the embodiment will be briefly described as follows:

When receiving an attack such as that external time information acquired from outside is tampered, it is possible to determine that the external time information is illegal time information, so that it is possible to deal with the attack.

DETAILED DESCRIPTION

Figure 1:
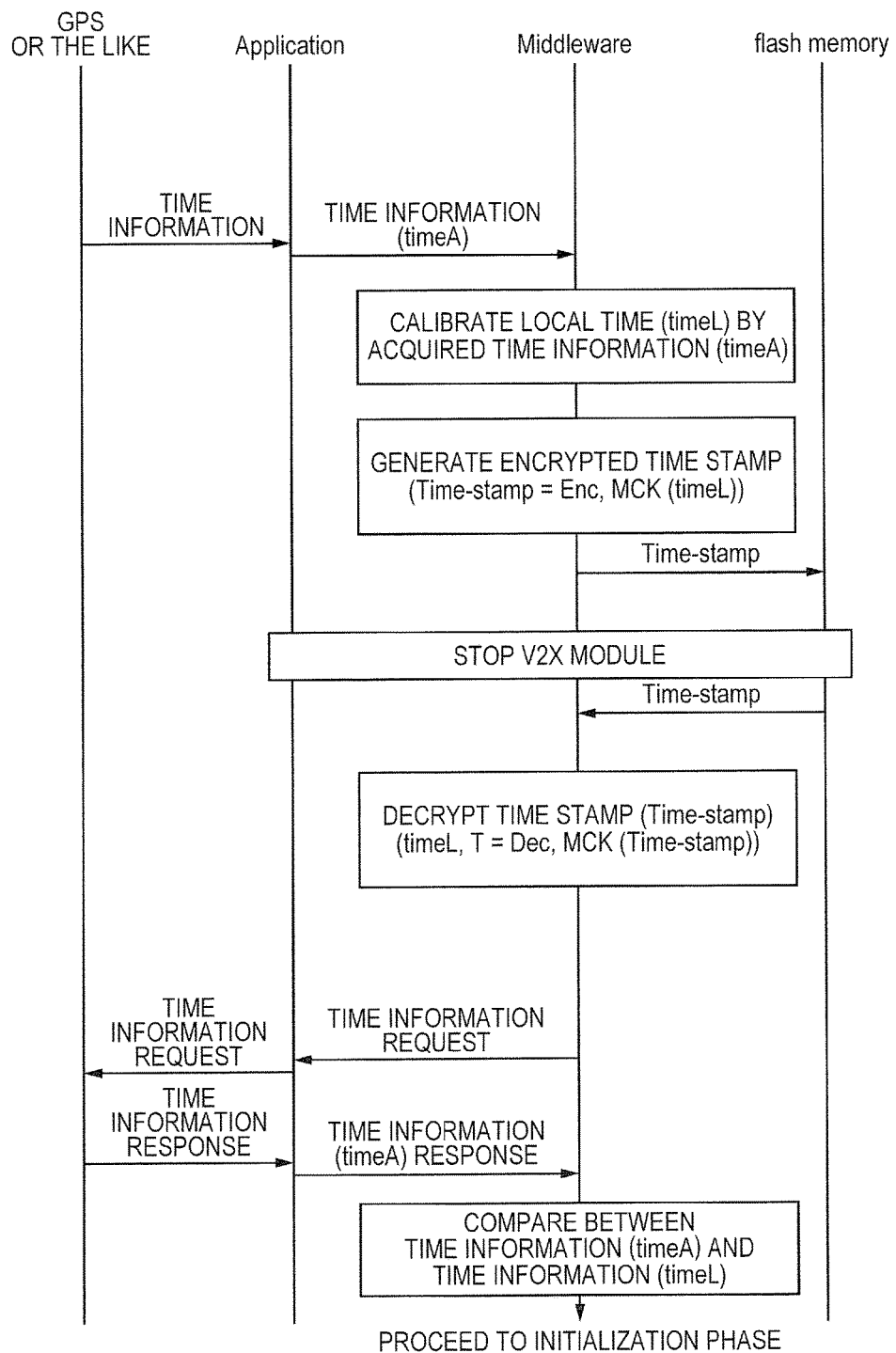
FIG. 1 is a flow diagram showing an operation of a communication terminal according to a first embodiment.

Embodiments will be described in detail. In all the drawings for explaining the embodiments of the invention, components having the same function are denoted by the same reference numeral and repetitive description thereof will be omitted.

First Embodiment

FIG. 1 is a flow diagram showing an operation of a communication terminal according to a first embodiment. The communication terminal according to the present embodiment is a communication terminal that holds internal time information for verifying validity of a certificate in cryptographic communication and, for example, is an on-vehicle communication terminal. The communication terminal includes a communication interface for acquiring external time information from outside, a non-volatile memory, and a processor. FIG. 1 shows an operation flow of a GPS module that provides GPS information as the external time information, an application program and middleware that operate in the communication terminal, and a flash memory used as a non-volatile memory, as a time course from top to bottom.

Figure 2:
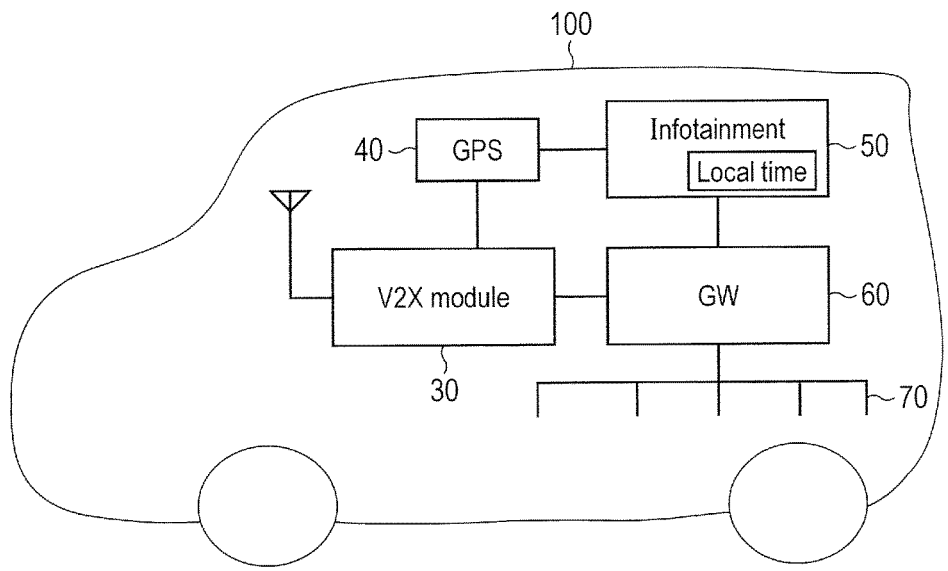
FIG. 2 is an illustration schematically showing an application example of V2X to an on-vehicle communication terminal.

FIG. 2 is an illustration schematically showing an application example of V2X to the on-vehicle communication terminal. An embodiment of the communication terminal according to the first embodiment is a V2X module 30 mounted in a vehicle 100. The V2X module 30 is configured to be directly or indirectly coupled to a GPS module 40 coupled to an infotainment device 50 that provides a navigation function and the like and to be able to acquire GPS information as the external time information. The V2X module 30 and the infotainment device 50 are coupled to other electronic devices (not shown in the drawings) in the vehicle through a gateway (GW: Gate Way) 60 and an on-vehicle network 70 such as FlexRay (registered trademark) and CAN. Both or either one of the V2X module 30 and the infotainment device 50 holds the internal time information (Local Time).

Figure 3:
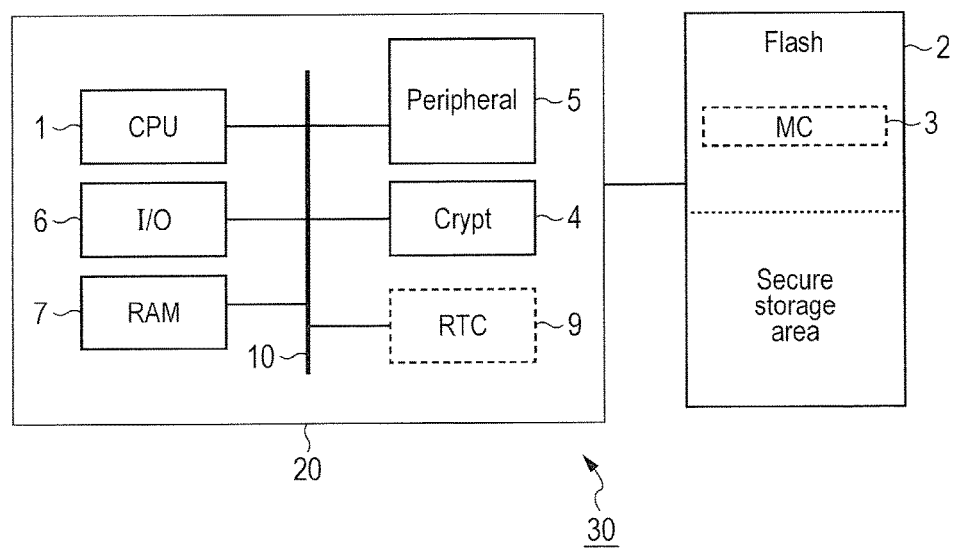
FIG. 3 is a block diagram showing a configuration example of the communication terminal.

FIG. 3 is a block diagram showing a configuration example of the communication terminal. The V2X module 30 includes a SoC 20 in which a CPU 1, an I/O 6, a RAM 7, a peripheral module 5, a cryptographic engine (Crypt) 4, and the like are coupled to each other through a bus 10 and a flash memory 2. Here, the SoC is an abbreviation of System on a Chip and is a system LSI (Large Scale Integrated circuit) integrated on a single semiconductor substrate. The CPU is an abbreviation of Central Processing Unit and is a general processor that executes commands according to a program being supplied. Although described later, a real time clock (RTC) 9 may be coupled to the bus 10. The flash memory 20 is provided with not only a normal storage area where an application program and middleware that are executed by the CPU 1 are stored but also a secure storage area (Secure storage area) where access from other than the CPU 1 is limited. The V2X module 30 can request time information from the external GPS module 40 coupled through, for example, the I/O 6, and acquire external time information.

Figure 4:
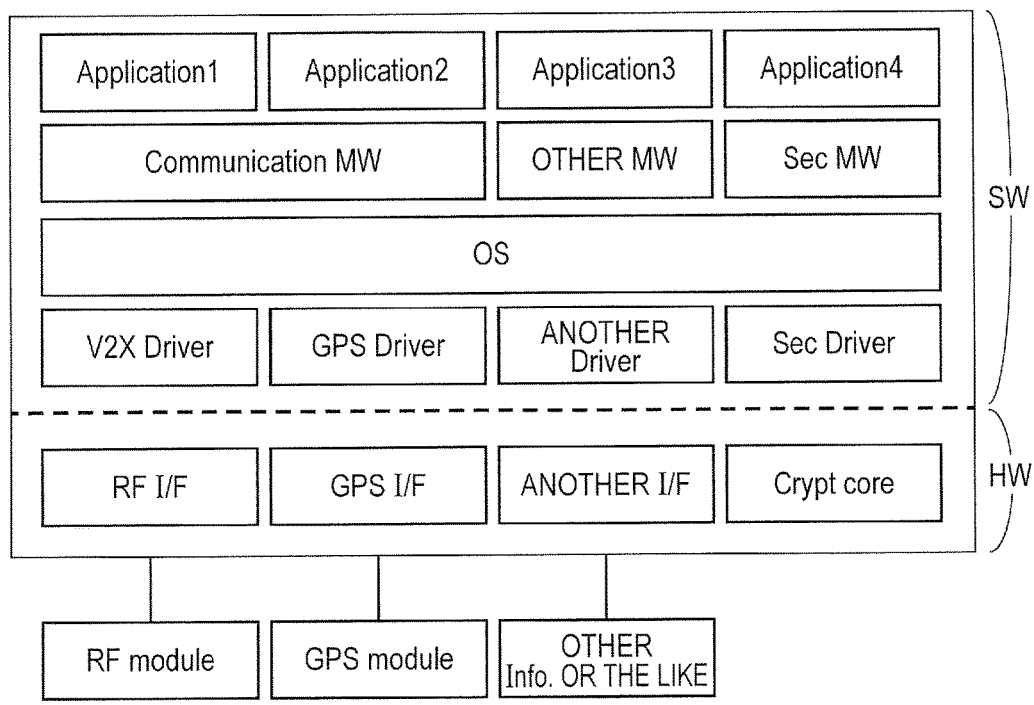
FIG. 4 is a hierarchy diagram showing a configuration example of functions implemented in the communication terminal.

FIG. 4 is a hierarchy diagram showing a configuration example of functions implemented in the communication terminal. FIG. 4 is an example where the communication terminal is the V2X module 30. FIG. 4 shows software (SW) executed by the CPU 1, hardware (HW) included in the SoC 20, and hardware coupled to the hardware (HW). The software (SW) includes lowest various drivers, an operating system (OS), various middleware, and a highest application layer (Applications 1 to 4). The hardware (HW) included in the SoC includes Crypt core that is a function of the cryptographic engine 4 and further includes an RF interface (RF I/F), a GPS interface (GPS I/F), and another interface (another I/F) as a type of the input/output interface (I/O) 6. The RF interface (RF I/F) is coupled to an external high frequency module (RF module) and performs V2X communication. The GPS interface (GPS I/F) is coupled to the GPS module 40 and acquires external time information. The GPS interface (GPS I/F) can acquire position information along with the external time information. The other interface (another I/F) is an interface coupled to the infotainment device 50 and the like.

The various drivers included in the software (SW) include a V2X driver that drives the RF interface, a GPS driver that drives the GPS interface, another driver that drives the other interface, and a Sec driver that drives the Crypt core. Here, the "drives" is "drives" from the viewpoint of functional aspect and the "drives" includes setting necessary parameters and inputting/outputting data. The various drivers are managed by the OS and interfaced with the upper middleware. The middleware includes communication middleware (Communication MW) for the V2X communication, security middleware (Sec MW) for security function, and other middleware.

Let us return to the description of FIG. 1. Although not limited in particular, in the description below, it is assumed that the communication terminal mounted in the vehicle 100 is the V2X module 30. "Stop V2X module" is shown around the center of FIG. 1. This step is a period of time in which the vehicle 100 is parked in a parking lot or the like and power supply to the V2X module is stopped. In such a period of time, there is a threat that an attack to alter the GPS module 40 or the like is made by a malicious third party, and as a result, external time information acquired after that is tampered. In the present embodiment, it is verified whether or not newly acquired external time information (timeA) is tampered by comparing the external time information (timeA) with internal time information (timeL) in a later step indicating an initialization sequence after the power supply to the V2X module 30 is resumed. It is assumed that the middleware in FIG. 1 is the security middleware (Sec MW) in FIG. 4. However, the applications are optional.

Hereinafter, the operation will be described in detail according to a time sequence.

The middleware acquires the time information (timeA) from the GPS module 40 or the like through an application. The middleware may directly acquire the time information (timeA) from the GPS module 40 or the like without through an application. The middleware calibrates the local time (timeL) held in the V2X module 30 by the acquired external time information (timeA). Here, when an error between the acquired external time information (timeA) and the local time (timeL) is greater than a certain value, the middleware may determine that there is some attack and move to processing to deal with the attack (error handling processing). The calibrated local time (timeL) is encrypted and generated as a time stamp (Time-stamp). The generated time stamp (Time-stamp) is written to a non-volatile memory (Flash memory) 2. It is desirable that the time stamp (Time-stamp) is written to a secure storage area (Secure storage area) in the non-volatile memory (Flash memory) 2. Thereby, it is possible to further improve resistance against direct attack to the V2X module 30 that is stopped.

It is preferable that a series of steps including the acquisition of the external time information (timeA) from the GPS module, the calibration of the local time (timeL), the generation of the encrypted time stamp (Time-stamp), and the writing of the time stamp (Time-stamp) to the non-volatile memory (Flash memory) 2 is periodically performed. At this time, an appropriate period is about one to five minutes. However, the period is not necessarily a constant period. The series of steps is performed periodically, so that the time stamp (Time-stamp) based on the local time (timeL) immediately before the V2X module is stopped is written to the non-volatile memory (Flash memory) 2 and held.

In an initialization sequence after power-on of the V2X module 30, the middleware reads the time stamp (Time-stamp) from the non-volatile memory (Flash memory) 2, decrypts an encryption, and restores the local time (timeL) that is the internal time information lastly written to the non-volatile memory (Flash memory) 2 before the power-on. After, that or, in parallel with that, the middleware requests the time information from the GPS module 40 and acquires new external time information (timeA). The middleware verifies validity of the acquired external time information (timeA) by comparing the acquired external time information (timeA) and the restored local time (timeL).

When the newly acquired external time information (timeA) indicates a time older than the restored local time (timeL), it is considered that the acquired external time information (timeA) is tampered, so that it is determined that there is some attack and the process proceeds to the processing to deal with the attack (error handling processing). On the other hand, when the validity of the acquired external time information (timeA) is confirmed, the process proceeds to a normal initialization phase.

Thereby, when receiving an attack such as that the external time information acquired from outside is tampered, it is possible to determine that the external time information is illegal time information, so that it is possible to deal with the attack.

The first embodiment is described by using an example applied to the V2X module 30 for performing the V2X communication. However, the first embodiment can be applied not only to the V2X communication, but also to various cryptographic communications and communication terminals. The configuration example of the communication terminal 30 shown in FIG. 3 and the configuration example of the functions shown in FIG. 4 are examples, respectively, and they can be variously modified.

Second Embodiment

Figure 5:
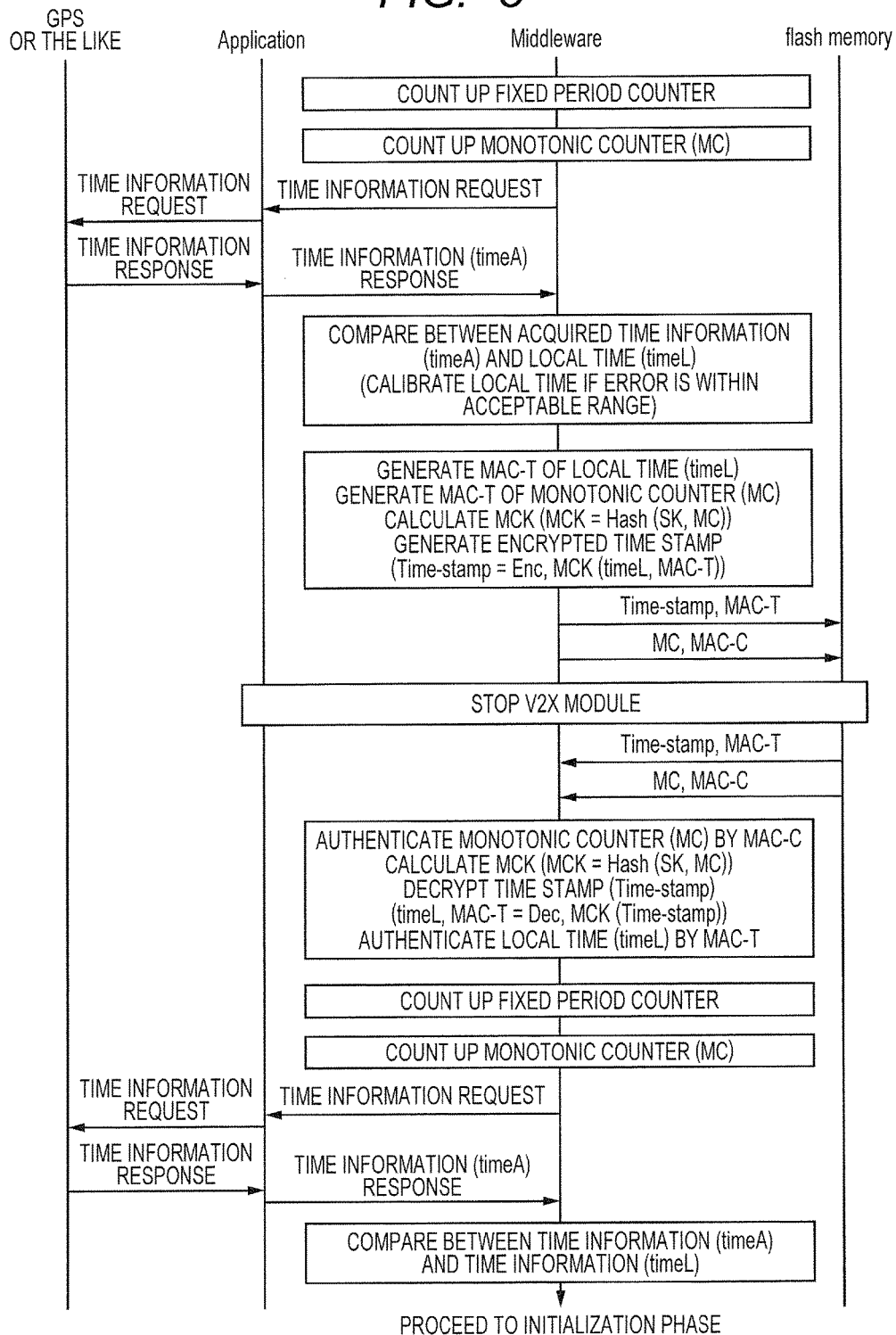
FIG. 5 is a flow diagram showing an operation of a communication terminal according to a second embodiment.

A more preferred embodiment will be described in detail. FIG. 5 is a flow diagram showing an operation of a communication terminal according to a second embodiment. In the same manner as the communication terminal illustrated in the first embodiment, the communication terminal according to the second embodiment is the V2X module 30 for performing the V2X communication. However, the communication terminal can be applied not only to the V2X communication, but also to various cryptographic communications and communication terminals. The application example of V2X to the on-vehicle communication terminal shown in FIG. 2, the configuration example of the communication terminal shown in FIG. 3, and the functions implemented in the communication terminal shown in FIG. 4 are also applied to the communication terminal according to the second embodiment. However, these are not limited and can be variously changed.

In the same manner as FIG. 1, FIG. 5 shows an operation flow of the GPS module that provides GPS information as the external time information, an application program and middleware that operate in the communication terminal, and a flash memory used as a non-volatile memory, as a time course from top to bottom. Also in the second embodiment, the sequence of the security middleware includes storing the time stamp (Time-stamp) before the V2X module 30 stops and the initialization sequence after the power supply to the V2X module 30 is resumed.

The communication terminal according to the second embodiment is different from the communication terminal according to the first embodiment described above in a point that the communication terminal according to the second embodiment further includes a monotonic counter (MC) and in a point that a cryptographic key (MCK) for encryption is generated based on a count value of the monotonic counter (MC). The monotonic counter (MC) is a counter that monotonically increases or decreases and is configured so that a count value held immediately before the last power-off before the V2X module 30 stops and a count value after the power-on when the power supply to the V2X module 30 is resumed maintain continuity of the monotonic increase or decrease. Further, the communication terminal according to the second embodiment is different from the communication terminal according to the first embodiment in a point that a message authentication code (MAC) is added to the time stamp (Time-stamp) and the count value of the monotonic counter (MC), respectively, and the integrity is confirmed. Thereby, the security level is further improved.

Let us return to FIG. 5. The operation will be described in detail according to a time sequence.

The security middleware counts up a fixed period counter and periodically counts up the monotonic counter (MC). The cycle depends on a system design. However, it is desirable that the cycle is once in one to five minutes considering from a viewpoint of countermeasure against replay attack. Every time the security middleware counts up the monotonic counter (MC), the security middleware requests time information from the GPS or the like and acquires external time information (timeA). The security middleware compares the acquired external time information (timeA) and local time (timeL) and if an error is within an acceptable range, the security middleware calibrates the local time (timeL) by the external time information (timeA). The security middleware counts up the local time (timeL) by using a clock signal of a crystal oscillator included in the security middleware. The time accuracy of the local time (timeL) and the acceptable range of the error depend on implementation. However, for example, when the period of counting up of the fixed period counter is one to five minutes, if the error between the actual time information acquired from the GPS and the local time (timeL) is greater than or equal to one second, the function of a clock is not established, so that it is considered that an appropriate value of the time error is one second or less. After confirming that there is no discrepancy between the compared time information pieces, the local time (timeL) is calibrated by the external time information (timeA). Here, "calibration" means an operation to bring the local time (timeL) close to the external time information (timeA) and "calibration" is not necessarily an operation to replace the local time (timeL) with the external time information (timeA). This is because when the error is large, if the replacement operation is performed, a discontinuity occurs in the local time (timeL), so that a trouble in a system may occur. Whether the local time (timeL) is gradually brought close to the external time information (timeA) or the local time (timeL) is replaced with the external time information (timeA) depends on a system design. When the error exceeds the acceptable range, the process proceeds to a predetermined error handling. When the error is very large, it is determined that there is some attack and the process may proceed to processing to deal with the attack.

The calibrated local time (timeL) is encrypted and written to the non-volatile memory (Flash memory) 2 in the same manner as in the first embodiment. In the second embodiment, the cryptographic key (MCK) for encryption is generated based on the monotonic counter (MC) every time and further a message authentication code (MAC) is added to the local time (timeL) and the count value of the monotonic counter (MC), respectively. More specifically, the security middleware generates MAC-T that is the message authentication code of the local time (timeL) and generates MAC-C that is the message authentication code of the count value of the monotonic counter (MC). Subsequently, the security middleware calculates the cryptographic key (MCK) by a hash function from the count value of the monotonic counter (MC) and a secret key (SK) held by the security middleware. Thereafter, the security middleware generates a time stamp (Time-stamp) obtained by encrypting the local time (timeL) and the message authentication code (MAC-T) of the local time (timeL) by using the calculated cryptographic key (MCK). Finally, the security middleware writes the encrypted time stamp (Time-stamp), the message authentication code (MAC-T) of the local time (timeL), the cryptographic key (MCK), the count value of the monotonic counter (MC), and the message authentication code (MAC-C) of the count value of the monotonic counter (MC) into the non-volatile memory (Flash memory) 2.

The operation described above is periodically activated by the fixed period counter described above and is performed every time the monotonic counter (MC) counts up. Therefore, even if the V2X module 30 is stopped at any time, the local time (timeL) calibrated immediately before that, that is, the time stamp (Time-stamp) based on the latest time information, is always written to the non-volatile memory (Flash memory) 2.

When the power supply to the V2X module 30 is resumed, the initialization sequence after the power-on (power-up sequence) accompanying that is performed. In the initialization sequence, the CPU 1 causes the security middleware to operate and reads the encrypted time stamp (Time-stamp), the message authentication code (MAC-T) of the local time (timeL), the cryptographic key (MCK), the count value of the monotonic counter (MC), and the message authentication code (MAC-C) of the count value of the monotonic counter (MC) from the non-volatile memory (Flash memory) 2.

The security middleware confirms the validity of the read count value of the monotonic counter (MC) by using the message authentication code (MAC-C) of the count value of the monotonic counter (MC). After the validity is confirmed, the security middleware generates the cryptographic key (MCK) by a hash function from the count value of the monotonic counter (MC) and a secret key (SK) held by the security middleware. The security middleware decrypts the time stamp (Time-stamp) read from the non-volatile memory (Flash memory) 2 by using the cryptographic key (MCK), so that the local time (timeL) that is the latest time information before the power supply to the V2X module 30 is shut down and the message authentication code (MAC-T) of the local time (timeL) are decrypted. The security middleware confirms the validity of the decrypted local time (timeL) by using the message authentication code (MAC-T) of the decrypted local time (timeL). Thereby, the local time (timeL) calibrated immediately before the V2X module 30 is stopped is known.

Thereafter, or in parallel with the above, the security middleware periodically counts up the monotonic counter (MC) by the count-up operation of the fixed period counter, requests the time information from the GPS or the like, and acquires the external time information (timeA). The security middleware compares the acquired external time information (timeA) and the local time (timeL) obtained by decrypting the time stamp (Time-stamp) and confirms that the acquired external time information (timeA) is not tampered. When the acquired external time information (timeA) indicates a time later than the local time (timeL) obtained by decrypting the time stamp (Time-stamp), the process proceeds to an initialization phase in which the local time (timeL) is calibrated based on the acquired external time information (timeA). On the other hand, when the acquired external time information (timeA) indicates a time earlier later than the local time (timeL) obtained by decrypting the time stamp (Time-stamp), it is obvious that the acquired external time information (timeA) is tampered, so that the process proceeds to the error handling processing.

In the first embodiment, after the monotonic counter (MC) is counted up, the external time information (timeA) from the GPS or the like is acquired. Therefore, the count value immediately before the V2X module is stopped seamlessly continues to the count value immediately after the V2X module is resumed. Therefore, it is possible to further improve the security level by verifying the continuity of the monotonic counter (MC) in addition to comparing and verifying the external time information (timeA) and the local time (timeL) obtained by decrypting the time stamp (Time-stamp).

As described above, in the same manner as in the first embodiment, when receiving an attack such as that the external time information acquired from outside is tampered, it is possible to determine that the external time information is illegal time information, so that it is possible to deal with the attack. According to the second embodiment, the cryptographic key is changed every time by the monotonic counter (MC), so that it is possible to further improve resistance against the replay attack. Further, the local time (timeL) and the monotonic counter (MC) are provided with the message authentication codes (MAC-T and MAC-C), respectively, and the integrity is confirmed, so that it is also possible to improve resistance against attack to the local time (timeL) and the counter.

Although an example is described in which the monotonic counter (MC) monotonically increases, the monotonic counter (MC) may monotonically decrease by being counted down. An overflow (including a negative overflow in the case of countdown) is compensated by a publicly known method. For example, correction is performed by using an overflow flag and overflow is not generated on appearance so that the monotonic increase or the monotonic decrease continues. Modified Examples of Second Embodiment In the above description, the monotonic counter (MC) is implemented as software in the security middleware. However, the monotonic counter (MC) may be implemented as hardware. The non-volatile memory (Flash memory) 2 is a chip separate from the SoC 20 including the CPU 1. However, the non-volatile memory (Flash memory) 2 may be included in the SoC 20.

Figure 6:
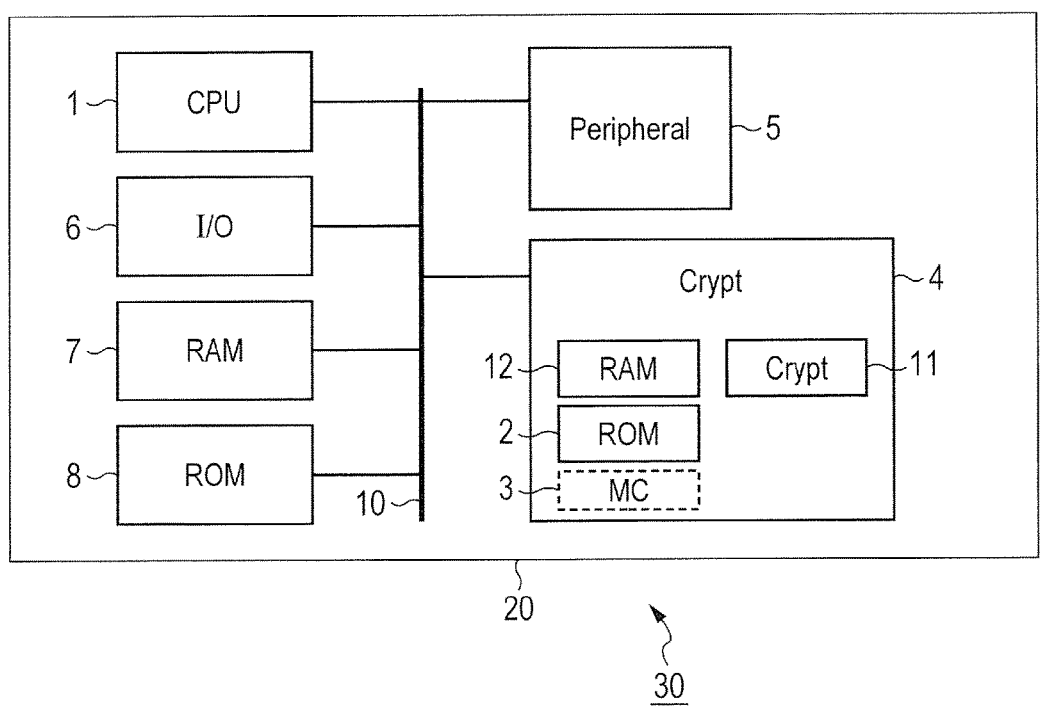
FIG. 6 is a block diagram showing another configuration example of the communication terminal.

FIG. 6 is a block diagram showing another configuration example of the communication terminal. The V2X module 30 shown in FIG. 6 is different from the V2X module 30 shown in FIG. 3 and it is not assumed that the flash memory 2 is externally coupled to the V2X module shown in FIG. 6. The V2X module shown in FIG. 6 is composed of only the SoC 20. In the SoC 20, the CPU 1, the I/O 6, the RAM 7, the peripheral module 5, the cryptographic engine (Crypt) 4, and the like are coupled to each other through the bus 10. Further, the SoC 20 includes a ROM 8 in which programs such as the security middleware and the like are stored. In the cryptographic engine (Crypt) 4, a cryptographic operation circuit (Crypt) 11, a RAM 12 and a ROM 2 that are protected in a secure environment, and a monotonic counter (MC) 3 are implemented as hardware. The ROM 2 is a non-volatile memory, and in the same manner as in the flow diagram in FIG. 5, the encrypted time stamp (Time-stamp), the message authentication code (MAC-T) of the local time (timeL), the cryptographic key (MCK), the count value of the monotonic counter (MC), and the message authentication code (MAC-C) of the count value of the monotonic counter (MC) are written to the ROM 2. The other operation is the same as the flow shown in FIG. 5, so that the description is omitted.

In this modified example, even the count value of the monotonic counter (MC) and the encrypted time stamp (Time-stamp) are not outputted to the outside of the SoC 20, so that it is also possible to improve resistance against attack to the local time (timeL) and the counter.

Figure 7:
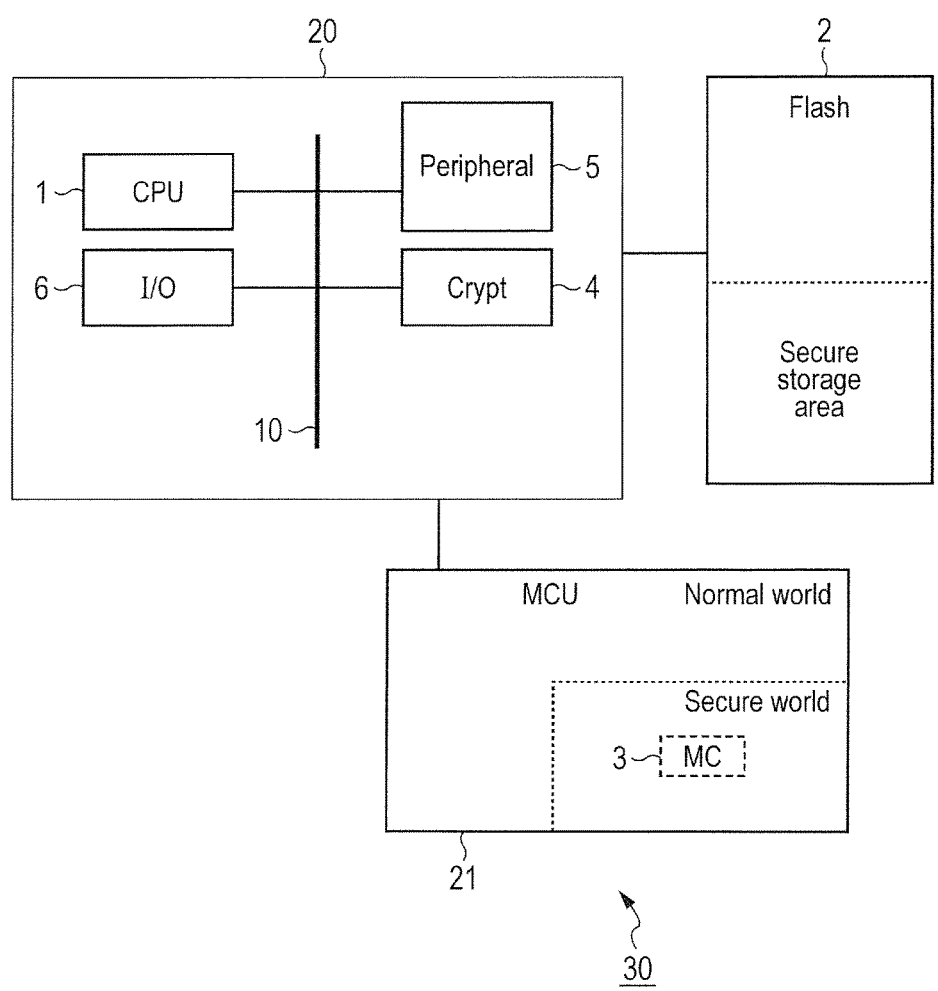
FIG. 7 is a block diagram showing yet another configuration example of the communication terminal.

FIG. 7 is a block diagram showing further another configuration example of the communication terminal. Different from the V2X module 30 shown in FIG. 3, another MCU (Micro Controller Unit) 21 is coupled to the SoC 20. The MCU 21 is, for example, a control MCU in the V2X module 30 and has a secure area (Secure World) in addition to a normal function area (Normal World). The monotonic counter (MC) 3 may be provided in the secure area of the MCU 21 externally coupled in this way.

Third Embodiment

In the second embodiment, the resistance against the replay attack is improved by generating a different cryptographic key (MCK) every time by using the monotonically increasing or monotonically decreasing monotonic counter (MC). In a third embodiment, a different cryptographic key is generated every time by using random numbers, where a different value is generated every time, instead of the monotonic counter (MC). The other configurations are the same as those shown in FIGS. 2, 3, and 6 and the operation is the same as that shown in FIG. 5. When the monotonic counter (MC) is used, it is possible to further improve the security level by verifying the continuity of the monotonic counter (MC). However, when replacing the monotonic counter (MC) with the random numbers, although the continuity cannot be verified, it is possible to improve the resistance against the replay attack to some extent by confirming that the cryptographic key is not the same value (random number).

Fourth Embodiment

The resistance against the replay attack is improved by generating a different cryptographic key (MCK) every time by using the monotonic counter (MC) in the second embodiment and by using the random numbers in the third embodiment. In a fourth embodiment, the resistance against the replay attack is improved by generating a different cryptographic key every time by using time information managed by a real time clock (RTC) instead of the monotonic counter (MC) and the random numbers.

The real time clock (RTC) is a circuit that holds time information by causing a crystal oscillation circuit of very low frequency to continuously operate by being supplied with a necessary minimum power from a battery or the like on a circuit board ever when the power supply to the device is stopped. The real time clock (RTC) is often mounted in an infotainment device such as a navigation system.

Although the real time clock (RTC) is not controlled by the security middleware, the real time clock (RTC) monotonically increases, so that it is preferable to replace the monotonic counter (MC) with the real time clock (RTC). In the same manner as in the second embodiment, it is possible to generate a different cryptographic key every time, and further it is possible to verify the continuity. Different from the monotonic counter (MC), the real time clock (RTC) does not generate continuity of +1 by count up. However, in the same manner as the local time (timeL), it is possible to verify the continuity by verifying that the time does not go back to the past. Further, both are information that represents the time, so that it is possible to use the local time (timeL) and the real time clock (RTC) for verification whether or not there is an attack such as tampering by comparing an error between the local time (timeL) and the real time clock (RTC) immediately before the V2X module 30 stops and an error between the local time (timeL) and the real time clock (RTC) immediately after the operation is resumed. It is possible to detect signs of tampering by comparing the errors between the two times unless the two times are tampered in the same manner, so that the security level is not so much lowered as compared with a case in which the monotonic counter (MC) is used.

The real time clock (RTC) may be included in the SoC 20 as shown in FIG. 3 or may be configured to be included in the MCU 21 in FIG. 7 so that the SoC 20 can refer to the value of the real time clock (RTC).

While the invention made by the inventors has been specifically described based on the embodiments, it is needless to say that the present invention is not limited to the embodiments and may be variously modified without departing from the scope of the invention.

For example, although the SoC 20 includes the cryptographic engine (Crypt) 4 in the above description, the functions such as encryption, decryption, and authentication may be performed by software executed by the CPU. The configurations of the communication terminal 30 and the SoC 20 are optional and hardware configurations can be variously modified. For example, other functional modules may be included, apart of functional modules shown in the drawings may be omitted, or the bus may be hierarchized.

What is claimed is:

1. A communication terminal that holds internal time information for verifying validity of a certificate in cryptographic communication, the communication terminal comprising:
   a communication interface for acquiring external time information from outside;
   a non-volatile memory; and
   a processor,
   wherein the processor periodically:
      acquires external time information;
      calibrates the internal time information by bringing the internal time information closer to the external time information, or setting the internal time information equal to the external time information; and
      encrypts the internal time information calibrated based on the acquired external time information, and thereafter writes the encrypted internal time information into the non-volatile memory based on a program to be supplied,
   wherein, in an initialization sequence after power-on of the communication terminal, the processor reads and decrypts internal time information that is lastly written to the non-volatile memory before the power-on, acquires external time information, and verifies validity of the acquired external time information by comparing the acquired external time information with the read internal time information based on the program.

2. The communication terminal according to claim 1, further comprising:
   a counter that monotonically increases or decreases,
   wherein the counter is configured so that a count value held immediately before last power-off before the power-on and a count value after the power-on maintain continuity of the monotonic increase or decrease, and
   wherein the processor generates a cryptographic key based on a count value of the counter of when the encryption is performed based on the program.

3. The communication terminal according to claim 2, wherein when the processor performs the encryption, the processor provides message authentication codes to the count value of the counter and the calibrated internal time information, respectively, based on the program, and wherein, in the initialization sequence after the power-on of the communication terminal, the processor confirms validity of the count value and the internal time information based on the message authentication codes respectively provided to the count value and the internal time information based on the program.

4. The communication terminal according to claim 3,
wherein when the processor performs the encryption, the processor writes the message authentication codes respectively provided to the count value of the counter and the calibrated internal time information into the non-volatile memory along with the encrypted internal time information based on the program, and wherein, in the initialization sequence after the power-on of the communication terminal, the processor reads the message authentication codes respectively provided to the count value of the counter and the calibrated internal time information from the non-volatile memory along with the encrypted internal time information and confirms validity of each of the count value and the internal time information.

5. The communication terminal according to claim 4,
wherein the processor monotonically increases or decreases the count value of the counter based on the program.

6. The communication terminal according to claim 5,
wherein the non-volatile memory is mounted as a semiconductor chip different from the processor and includes a secure storage area where access from other than the processor is limited and a normal storage area,
wherein the normal storage area holds the program, and
wherein message authentication codes respectively provided to the count value of the counter, the encrypted internal time information, and the calibrated internal time information are held in the secure storage area.

7. The communication terminal according to claim 4,
wherein the communication terminal includes the processor and a cryptographic engine on the same semiconductor chip,
wherein the counter is mounted in the cryptographic engine, and
wherein the processor accelerates functions of the encryption and the decryption by using the cryptographic engine based on the program.

8. The communication terminal according to claim 2, further comprising:
a real time clock whose power supply is maintained even when power supply to the communication terminal is shut down,
wherein the real time clock functions as the counter.

9. The communication terminal according to claim 1, further comprising:
a random number generator,
wherein the processor generates a cryptographic key based on a random number generated by the random number generator.

10. The communication terminal according to claim 1,
wherein the communication terminal is configured to be mounted in a vehicle,
wherein the cryptographic communication includes communication between vehicles or communication between road and vehicle, and wherein the communication interface is a communication interface with a Global Positioning System (GPS) module.

11. A vehicle in which the communication terminal according to claim 1 is mounted.

12. A computer-implemented method for verifying validity of a certificate in cryptographic communication a communication terminal, the communication terminal including:
a communication interface for acquiring external time information from outside; and
a non-volatile memory,
and which holds internal time information,
the computer-implemented method comprising the steps of periodically:
acquiring external time information;
calibrating the internal time information by bringing the internal time information closer to the external time information, or setting the internal time information equal to the external time information; and
encrypting the internal time information calibrating based on the acquired external time information, and thereafter writing the encrypted internal time information into the non-volatile memory, and
the computer-implemented method further, in an initialization sequence after power-on of the communication terminal, including the steps of:
reading and decrypting internal time information that is lastly written to the non-volatile memory before the power-on;
newly acquiring external time information; and
verifying validity of the newly acquired external time information by comparing the newly acquired external time information with the read internal time information.

13. The computer-implemented method according to claim 12,
wherein the communication terminal further includes a counter that monotonically increases or decreases,
wherein the counter is configured so that a count value held immediately before last power-off before the power-on and a count value after the power-on maintain continuity of the monotonic increase or decrease, and
wherein the computer-implemented method further includes, during the encrypting, generating a cryptographic key based on a count value of the counter.

14. The computer implemented method according to claim 13,
wherein during the encryption, providing message authentication codes to the count value of the counter and the calibrated internal time information, respectively, and
wherein, in the initialization sequence after the power-on of the communication terminal, confirming validity of the count value and the internal time information based on the message authentication codes respectively provided to the count value and the internal time information.

15. The computer-implemented method according to claim 14,
wherein the computer-implemented method includes, during the encryption, writing the message authentication codes respectively provided to the count value of the counter and the calibrated internal time information into the non-volatile memory along with the encrypted internal time information, and in the initialization sequence after the power-on of the communication terminal, reading the message authentication codes respectively provided to the count value of the counter and the calibrated internal time information from the non-volatile memory along with the encrypted internal time information and confirming validity of each of the count value and the internal time information.

16. The computer-implemented method according to claim 15, the computer-implemented method including monotonically increasing or decreasing the count value of the counter.

17. The computer-implemented method according to claim 16, wherein the non-volatile memory is mounted as a semiconductor chip different from a processor and includes a secure storage area where access from other than the processor is limited and a normal storage area, wherein the normal storage area holds the instructions for performing the computer-implemented method, and wherein message authentication codes respectively provided to the count value of the counter, the encrypted internal time information, and the calibrated internal time information are held in the secure storage area.

18. The computer-implemented method according to claim 15, wherein the communication terminal includes a processor for executing the computer-implemented method, and a cryptographic engine on the same semiconductor chip, wherein the counter is mounted in the cryptographic engine, and wherein the computer-implemented method accelerates functions of the encryption and the decryption by using the cryptographic engine.

19. The computer-implemented method according to claim 13, wherein the communication terminal includes a real time clock whose power supply is maintained even when power supply to the communication terminal is shut down, and wherein the real time clock functions as the counter.

20. The computer-implemented method according to claim 12, wherein the communication terminal further includes a random number generator, and wherein the computer-implemented method includes generating a cryptographic key based on a random number generated by the random number generator.

* * * * *